United States Patent [19]

Baum

[11] Patent Number: 5,217,221
[45] Date of Patent: Jun. 8, 1993

[54] HOCKEY STICK FORMED OF COMPOSITE MATERIALS

[75] Inventor: Charles S. Baum, Traverse City, Mich.

[73] Assignee: The Baum Research & Development Company, Inc., Traverse City, Mich.

[21] Appl. No.: 687,519

[22] Filed: Apr. 19, 1991

Related U.S. Application Data

[63] Continuation-in-part of Ser. No. 518,782, May 4, 1990.

[51] Int. Cl.$^5$ .............................................. A63B 59/12
[52] U.S. Cl. ................................. 273/67 A; 273/73 J
[58] Field of Search ............ 273/67, 72, 73 J, DIG. 7, 273/82 R, 80.3; 428/35.6, 36.2, 326

[56] References Cited

U.S. PATENT DOCUMENTS

| | | |
|---|---|---|
| 3,934,875 | 1/1976 | Easton et al. .................... 273/67 A |
| 4,059,269 | 11/1977 | Tiitola .............................. 273/67 A |
| 4,124,208 | 11/1978 | Burns ............................... 273/67 A |
| 4,200,479 | 4/1980 | Ardell et al. ..................... 273/67 A |
| 4,591,155 | 5/1986 | Adachi ............................. 273/67 A |
| 4,689,257 | 8/1987 | Baum ............................... 273/72 R |
| 4,968,032 | 11/1990 | Redekop .......................... 273/67 A |

FOREIGN PATENT DOCUMENTS

| | | | |
|---|---|---|---|
| 2005952 | 10/1971 | Fed. Rep. of Germany ... | 273/67 A |
| 0038430 | 4/1978 | Japan ............................... | 273/67 A |
| 8203789 | 11/1982 | PCT Int'l Appl. ............... | 273/67 A |

Primary Examiner—William H. Grieb
Assistant Examiner—M. Graham
Attorney, Agent, or Firm—Krass & Young

[57] ABSTRACT

A hockey stick having the appearance of a solid wood stick and superior handling properties is formed with an outer layer of resin-impregnated wood veneer formed integrally with an inner sheath of fiber-reinforced fabric and resin. In one embodiment of the hockey stick, the two outer layers are formed over a core which may be formed of foamed plastic core. In an alternative embodiment, the foam core extends through the handle area and the blade is formed of synthetic fibers overlaid and bonded to an outer wood veneer sheath by resin which impregnates both layers.

15 Claims, 2 Drawing Sheets

HOCKEY STICK FORMED OF COMPOSITE MATERIALS

RELATED APPLICATION

This application is a continuation-in-part of patent application Ser. No. 518,782 filed May 4, 1990, entitled "COMPOSITE BASEBALL BAT."

FIELD OF THE INVENTION

This invention relates to hockey sticks and similar products and more particularly to such sticks formed in a composite manner with an outer sheath of structural wood veneer resin bonded to an inner synthetic fiber layer covering a structural lightweight core in at least the handle portion.

BACKGROUND OF THE INVENTION

Hockey sticks have traditionally been formed of solid wood, and hockey players are accustomed to the weight, balance and resiliency of these all-wood sticks. However, all-wood hockey sticks frequently break under the impacts occasioned by normal use. In a typical professional game about eight hockey sticks will break. Wooden sticks are very expensive given their short active lives and breakage during a game inconveniences the players and handicaps their teams.

For these reasons it has been proposed to provide hockey sticks formed of plastic resin reinforced with synthetic fibers such as carbon or epoxy. Within the desirable weight limits the synthetic sticks do not have sufficient strength to withstand breakage and are heavier than desired. They also do not provide the desirable resiliency of the conventional all-wood hockey stick and have become very expensive. Their unconventional appearance also offends many traditionalists. Accordingly, these all-synthetic hockey sticks have seen limited use.

SUMMARY OF THE INVENTION

The present invention is directed toward a hockey stick which provides all of the advantages of a conventional wooden stick in terms of performance flexibility, and appearance, yet is durable enough to resist breakage in normal use. The hockey stick of the present invention employs an outer sheath of structural wood veneer overlying a sheath of synthetic fibers with both layers impregnated and bonded together with synthetic resin to form an integral structure. At least the handle area of a hockey stick formed in accordance with the present invention employs a central core preferably formed of foamed plastic, balsa wood, honeycomb aluminum or similar materials and covered with a sheath of synthetic fibers and an overlying sheath of wood veneer, both impregnated with synthetic resin. In another alternative embodiment a round or rectangular thin wall aluminum or synthetic preformed tubes which also could be filled with foamed plastic, forms the central core. The central core of hockey sticks formed in accordance with the present invention may also be constructed of other lightweight, high strength materials, such as aluminum honeycomb or balsa wood having its grain aligned transversely to the length of the stick.

In the preferred embodiment of the invention, the core tapers and extends through the heel of the blade of the stick and in an alternative embodiment the core ends at the bottom of the handle so that the blade simply constitutes a section of fiber-reinforced resin covered by a resin-impregnated wood veneer. This alternative arrangement provides a very thin, highly resilient blade allowing for superior puck handling ability. Either form may be produced with any desired handle to blade angle (the "lie" of the stick).

The present invention is also directed to a method of forming these hockey sticks which comprises preforming a pair of wood veneer sheaths to their desired final shape by impregnating them with a liquid solution, shaping them to their desired finished form in mold sections, and drying them by allowing or causing the liquid to evaporate. Preferably, a pressure system is used to press the liquid impregnated sheaths against the molds to both shape and dry them.

Independently, a foam plastic core is molded and covered with a fibrous reinforced fabric sheath. The fibrous reinforcing fabric sheath is impregnated with liquid resin and then covered by the premolded wood veneer sections which are also impregnated with liquid resin. The cross section of the core and the amount and thickness of the wood, type of wood, the amount, type, weave, knit and the direction of the cords within the fiber layers and the core material density and physical properties may all be varied throughout the thickness and length of the stick to distribute the weight and strength in the most advantageous manner consistent with the intended usage, such as children's hockey or professional hockey or as a child's or adult's stick.

The central core, having the general shape of the final stick, but smaller dimensions is first covered with fiber cloth formed with high tensile strength fibers, or continuous cords preferably of Carbon Kevlar, or glass materials. The fibrous reinforcement fabric covers the entire outer surface of the core and if necessary, cap-like sections of fibrous reinforcement fabric may be applied to the handle end of the stick. The fibrous reinforcement fabric may be woven or knitted or formed of randomly arrayed fibers. In a preferred embodiment of the invention, which will subsequently be disclosed in detail, the core is first covered with two elongated sections of fibrous reinforcement fabric, each extending the full length of the stick, and each having a width along its length so that when the two sections are laid over the core their edges abut, forming two seams on diametrically opposed sides of the stick. Alternatively, the edges of the sections may overlap one another. The fabric from which these sections are formed preferably includes at least two groups of fibers or continuous cords. One group runs longitudinally so as to extend along the length of the stick. The other fiber group extends at right angles to the first group, or circumferentially about the stick, or alternatively, the fabric may include second and third fiber groups arrayed at angles of 45° to the longitudinally extending fibers on both sides, so that the 45° cords extend at 90° to one another. Preferably, these first two sections, which abut the core, are covered by a pair of similar sections displaced 90° radially relative to the first section so that each of the second sections is centered on one of the longitudinal seams formed between the underlying first sections.

These elongated fibrous reinforcement fabric sections are then preferably covered with elongated strips of fibrous reinforcement fabric which is spirally wound over the elongated sections. The fiber layer may be impregnated with resin prior to lamination through the use of pre-pregs or used in the liquid state during lamination. Any of the wide variety of commercially available synthetic resins for use in forming fibrous reinforcement fabric may be employed.

Before the resin is set the fiber-resin coated core is ready to receive the outer structural wood layers or layer which are resin-coated to ensure proper bonding. The wood layers are in the form of one or more planks or strips which are preformed and cut to desired shape and size. The composite is then pressed together through the use of split molds, vacuum bag or the like. The molds may also be heated to accelerate cure and allow the use of exotic bonding resins which cannot be worked at room temperature.

In the preferred embodiment the wood veneer strips and spirally wound tape extend slightly over the top end of the stick covering the core at the top end. The wood veneer planks are preferably cut from a single sheet so that the grain structures of adjacent planks match one another giving the finished stick the appearance of a conventional wood stick. The wood grains are preferably arrayed longitudinally along the length of the stick so that the tensile strength and impact resistance of the wood in the longitudinal direction is maximized.

The formed sections may be pressed against the core in split dies while the resin cures. The superior performance of the stick and resistance to breakage is believed to arise by virtue of the fibers of the wood, which are relatively resilient, distributing impact loads on the stick over relatively large numbers of the underlying synthetic fibers and strengthening the synthetic fibers to prevent their collapse in a compression/impact mode.

The density of the central foam core may be varied along the length of the stick to provide any combination of desired weight, balance and resilient characteristics.

The finished stick has the appearance of a traditional all-wood stick.

DETAILED DESCRIPTION OF THE DRAWINGS

Other applications and advantages of the present invention will be made clear by the following detailed description of several embodiments of the invention. The description makes reference to the accompanying drawings in which.

DETAILED DESCRIPTION OF THE PREFERRED EMBODIMENT

Figure 1:
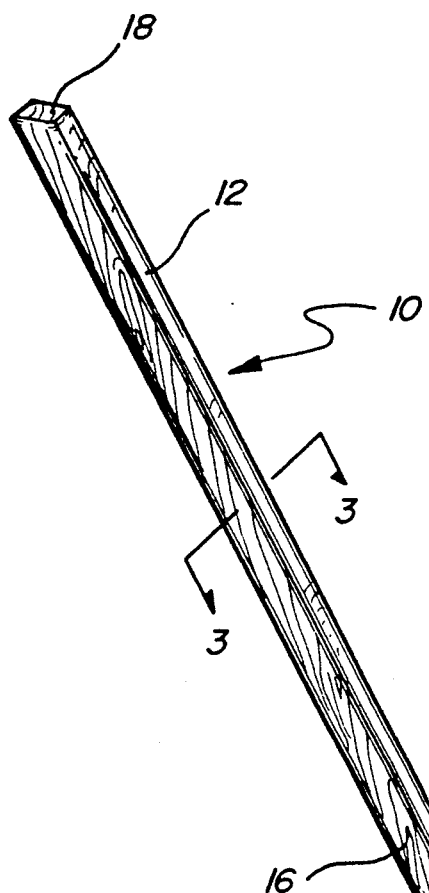
FIG. 1 is a perspective view of a hockey stick formed in accordance with the present invention.

Referring to the drawings, a hockey stick of the present invention, generally indicated at 10 in FIG. 1, preferably has the appearance of a normal hockey stick and consists of an elongated handle section 12 usually four to five feet in length of a generally rectangular cross section. Normally, the cross section of the handle section 12 is constant along its length, but it may vary along its length, as, by way of example, tapering slightly along its length so that the apparatus is somewhat larger than the lower end.

A blade section 14 formed integrally with the lower end of the handle extends outwardly from the lower end of the handle so that an obtuse angle, typically in the range of 100 degrees is formed between the handle 12 and the blade 14. The blade 14 is typically thinner and wider than the handle section 12 and may taper along its length so that its free end is slightly wider than the end joined to the bottom of the handle 12. The angle between the handle 12 and the blade 10, known as the "lie" of the stick may be varied, so that hockey sticks are made available with slightly different lies.

Figure 2:
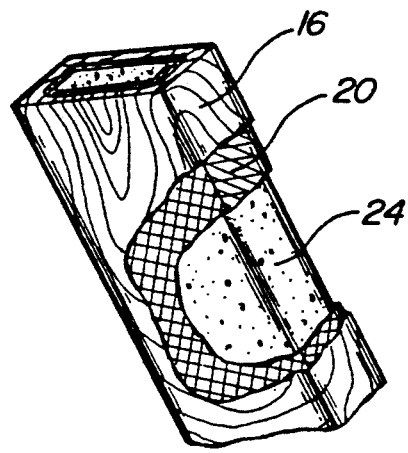
FIG. 2 is a detailed view of a section along the length of the hockey stick of FIG. 1 with portions of the surface broken away to illustrate the interior construction.

FIG. 2 illustrates the composite construction of the handle 12 of the hockey stick 10. The outer surface of the stick consists of a sheath of structural wood veneer 16, preferably having a thickness in the range of 1/16–3/16 of an inch. The veneer is preferably formed of a relatively hard wood such as ash or oak and the grain of the outer sheath is arranged to extend longitudinally along the length of the handle. The wood veneer layer 16 preferably extends over the blade area 14 giving the entire hockey stick the appearance of a conventional all-wood stick. Alternatively, in other embodiments of the invention only the handle 12 may be covered with the wood veneer. The butt end 18 of the stick may be covered with veneer or it may be capped by plastic (not shown) or the layers which form the stick may be cut off short so that the butt end 18 exposes a typical cross section through the handle.

The outer wood veneer layers 16 overlies a sheath 20 consisting of a layer of fibrous reinforcing fabric such as glass, Kevlar carbon, epoxy or various combinations, reinforcing a synthetic resin such as epoxy. The resin layer further impregnates the outer wood veneer sheath 16 and joins the wood veneer 16 in the underlying fiber layer 20 into an integral structure. The resin preferably covers the outer surface of the wood veneer 16 to protect and seal the wood fibers.

The synthetic fibers forming part of the layer 20 are typically relatively brittle and the fibers of the outer wood sheath 16 act to distribute impact loads over a number of the fibers so as to prevent the fibers from breaking in tension compression loads. The wooden sheath also stiffens the stick and gives it longitudinal strength and stiffness.

The fiber-reinforced resin sheath 20 overlies the central core 24 which is preferably formed of a synthetic foam such as urethane or polyvinyl. The foam may either be opened or closed cell. The foam core, covered with the fiber-reinforced resin sheath 20, in turn covered by the outer wood veneer layer 16, creates a handle that is lightweight yet has a great strength and designed stiffness.

In alternatives embodiments of the invention, the core 24 may be formed of materials other than foam plastic or may include foam plastic with other elements.

Figure 5:
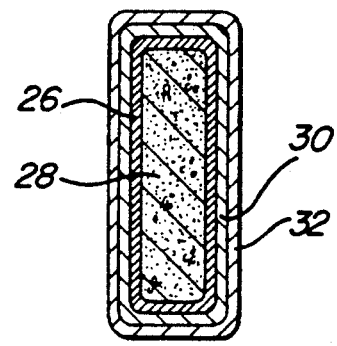
FIG. 5 is a cross-sectional view through a handle of an alternative embodiment of the invention employing a core surrounded by an aluminum tube.

For example, FIG. 5 illustrates an alternative form of construction for the handle wherein the core is formed by a hollow aluminum extrusion 26 having its central void filled with foam plastic 28, or could be hollow. The aluminum tube 26 is covered by a layer of fiber-reinforced resin 30 and an outer layer of wood veneer 32. The edges of all of the elements are preferably rounded to give the handle a generally rectangular/oval configuration.

Figure 3:
FIG. 3 is a cross-sectional view of the handle hockey stick of FIG. 1, taken of the along lines 3—3 of FIG. 1.

It should be understood that in alternative embodiments of the invention, the central core, as exemplified by the foam core 24 in the embodiment of FIGS. 1-3 or the foam-filled aluminum tube 26 of the embodiment FIG. 5, could be replaced by alternative materials such as a hollow metal tube, metal honeycomb or the like.

Figure 4:
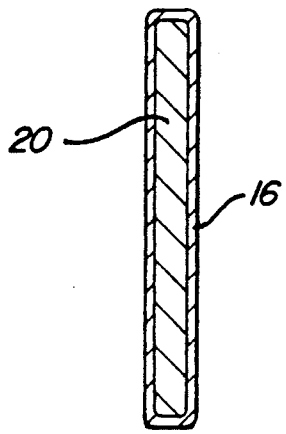
FIG. 4 is a cross-sectional view through the blade of the hockey stick of FIG. 1, taken along lines 4—4 of FIG. 1.

In the preferred embodiment of the invention illustrated in FIGS. 1-4 the central core terminates on a taper and allows unbroken cords continuation from handle to blade at the joinder of the handle 10 to the blade 14, and blade 14, illustrated in cross section in FIG. 4, consists of the layer of wood veneer 16 overlying and bonded to the central element 20 of fiber-reinforced resin. The blade 14 is thus more resilient than the handle 12; a desirable characteristic which is achieved in all wood sticks by virtue of the blade being thinner than the handle.

In alternative configurations the wood veneer outer cover 16 of the handle 12 could terminate at the blade, and the blade could constitute either a simple layer of resin reinforced fiber or resin reinforced fiber overlying a thin core element such as a sheet of aluminum or the like.

Figure 7:
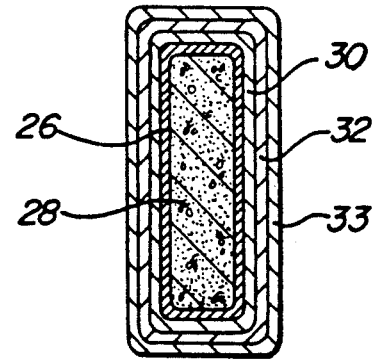
FIG. 7 is a cross-sectional view through a handle of is another alternative embodiment of the invention employing two layers of wood veneer in the outer sheath of the handle, with their grains oriented normally to one another.

Another alternative configuration illustrated in cross-section in FIG. 7 would employ a pair of wood veneer sheets 32 and 33 as the two outer layers of the stick, or the handle, with grains of the two sheets arranged orthogonally to one another to provide strength in two directions. Otherwise, the configuration of FIG. 7 is identical to that of FIG. 5 and the same reference numerals are employed.

Figure 6:
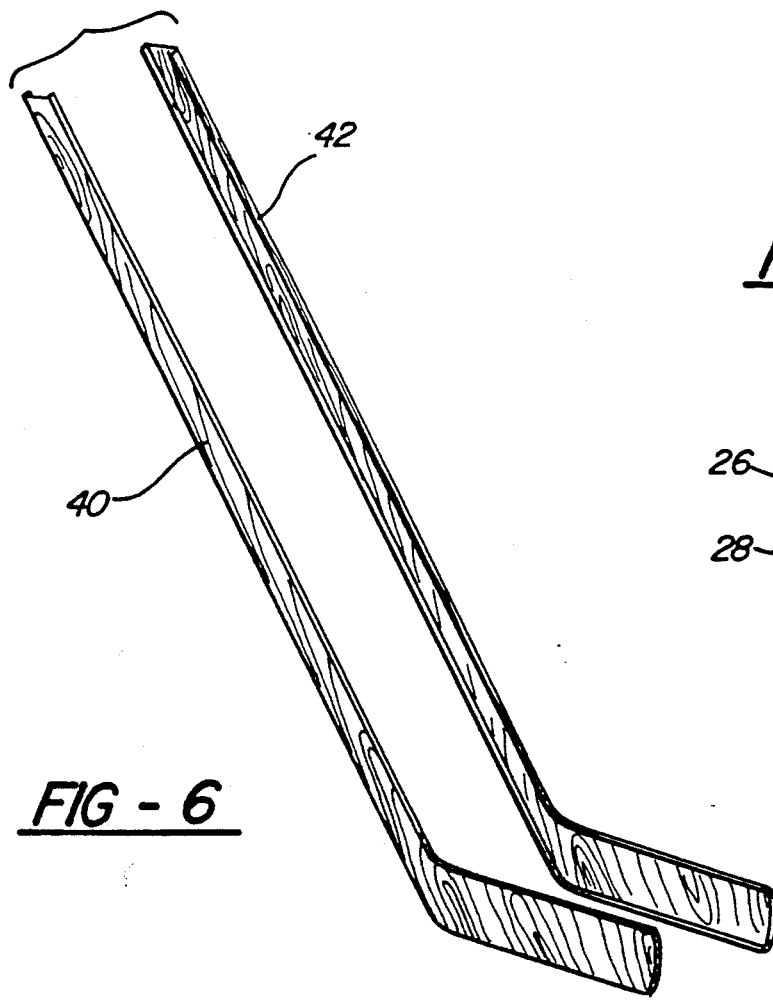
FIG. 6 is a perspective view of a complementary pair of wood veneer preforms created in connection with the process of the present invention is for use in forming the hockey sticks of the present invention.

The hockey sticks of the present invention are preferably formed by a method which involves the formation of a pair of complementary wood veneer preforms illustrated as 40 and 42 in FIG. 6. These preforms are shaped so that they may be joined together at their edges to form the skin of a completed hockey stick. The preforms 40 and 42 may be formed of either single layer or a double layer of the wood veneer. In the case of double layers, the outer layer has its grain arranged longitudinally to the length of the preform and the inner layer preferably has its grain arranged opposite to the first. The preforms are cut to an appropriate shape, are then soaked with a liquid such as water, alcohol or the like and are placed in suitably shaped molds (not shown). The preforms are then allowed to dry, preferably in preheated dried air, or their drying is accelerated by placing pressure over the preforms and heating the molds.

Independently, a core covered by fibrous reinforcing fabric is formed and both the fiber and the dried wood preform are impregnated with liquid resin and joined together so that the preforms cover the core. This may be done using molds or a vacuum bag. After the resin is fully set, the hockey stick of the present invention is completed.

Having thus described my invention, I claim:

1. A hockey stick comprising an elongated, generally rectangular handle and a shorter, thinner blade formed integrally with the handle at one end thereof and projecting with respect to the handle at an acute angle, the handle having a central core surrounded by an inner sheath of fiber-reinforced resin, which inner sheath is surrounded by a first outer sheath comprising a continuous elongated sheet of wood veneer having its length extending substantially parallel to the length of the handle and being shaped so as to extend over at least three faces of the handle, the sheet being impregnated with the resin and bonded to the inner sheath by said resin.

2. The hockey stick of claim 1 wherein the wood veneer layer is arrayed with its grain extending generally longitudinally with respect to the handle.

3. The hockey stick of claim 1 wherein the blade has a central core surrounded by resin-reinforced fiber.

4. The hockey stick of claim 3 wherein said central core of the blade is surrounded by an outer layer of wood veneer.

5. The hockey stick of claim 1 wherein the core comprises foam plastic.

6. The hockey stick of claim 1 wherein the core includes an elongated tubular member.

7. The hockey stick of claim 6 wherein the elongated tubular member consists of aluminum extrusion.

8. The hockey stick of claim 7 wherein the aluminum extrusion has a foamed plastic filling.

9. The hockey stick of claim 1 including a second sheath of wood veneer impregnated with resin lying between and bonded to the first outer sheath of wood veneer and the inner sheath of resin-impregnated fiber.

10. The method of forming a hockey stick having an outer surface comprising:
    molding a pair of elongated wood veneer preforms, each consisting of a complementary half of the outer surface of the finished stick;
    forming a central core having an outer surface;
    sheathing the entire outer surface of the core with fibrous reinforced fabric;
    impregnating the wood veneer preforms and the fibrous reinforcing fabric with liquid resin and bonding them together with the resin so that the wood veneer preforms sheath substantially the entire outer surface of the fabric.

11. The method of forming a hockey stick of claim 10 wherein the central core includes foam plastic.

12. The method of forming a hockey stick of claim 10 wherein the central core includes aluminum.

13. The method of forming a hockey stick of claim 10 wherein the wood veneer preforms each consist of two sheets of wood veneer having their grains arrayed at right angles relative to one another.

14. A hockey stick comprising an elongated tube of fibrous reinforced fabric having an outer surface and a first sheath of wood veneer surrounding substantially the entire outer surface of the fibrous reinforced fabric tube, the sheath comprising a unitary elongated sheet of wood veneer having its length extending substantially parallel to the length of the tube, the tube and the wood veneer each being impregnated with and adhered to one another by resin.

15. The hockey stick of claim 14 further including a second sheath of wood veneer sheet surrounding said first wood veneer sheath, the second wood veneer sheath having its grain extending substantially at right angles to the grain of the first wood veneer sheet and being impregnated with resin and adhered to the first wood veneer sheet by said resin.

* * * * *